US008607958B2

(12) United States Patent
Makovec et al.

(10) Patent No.: US 8,607,958 B2
(45) Date of Patent: Dec. 17, 2013

(54) ESCALATOR OR MOVING WALKWAY WITH A STEP-BELT OR PLATE-BELT BLOCKING DEVICE

(75) Inventors: Christoph Makovec, Wiener Neustadt (AT); Thomas Illedits, Neufeld (AT); Uwe Hauer, Nienburg (DE); Michael Matheisl, Vösendorf (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 13/457,787

(22) Filed: Apr. 27, 2012

(65) Prior Publication Data

US 2013/0112526 A1  May 9, 2013

(30) Foreign Application Priority Data

Apr. 29, 2011 (EP) .................................. 11164356

(51) Int. Cl.
*B66B 29/00* (2006.01)
(52) U.S. Cl.
USPC ....................................... 198/322; 196/832.3
(58) Field of Classification Search
USPC ............ 198/322, 323, 326, 330, 832.2, 832.3
See application file for complete search history.

(56) References Cited

U.S. PATENT DOCUMENTS

| | | | | |
|---|---|---|---|---|
| 657,639 A * | 9/1900 | Brestle | ........................... | 414/787 |
| 709,202 A * | 9/1902 | Clark | ......................... | 198/832.3 |
| 713,204 A * | 11/1902 | Carlson | .................... | 198/867.14 |
| 768,191 A * | 8/1904 | Patterson | ....................... | 104/178 |
| 834,883 A * | 11/1906 | Beach | .......................... | 198/832.3 |
| 984,586 A * | 2/1911 | McQueen | ........................ | 74/576 |
| 1,530,478 A * | 3/1925 | Carlson | ......................... | 198/832.2 |
| 1,729,079 A * | 9/1929 | Margles et al. | ........... | 198/810.04 |
| 2,259,366 A * | 10/1941 | Dunlop | ........................... | 198/323 |
| 2,460,017 A * | 1/1949 | Lautrup et al. | .................. | 188/69 |
| 2,873,848 A * | 2/1959 | Steinmetz | ................... | 198/832.2 |
| 3,677,423 A * | 7/1972 | Tollefsrud et al. | ............. | 198/300 |
| 3,695,183 A * | 10/1972 | Zuppiger | ....................... | 198/792 |
| 3,871,514 A * | 3/1975 | Hewitt et al. | ............. | 198/810.02 |
| 5,895,193 A * | 4/1999 | Ung | ............................... | 414/327 |
| 6,896,119 B2 * | 5/2005 | Wiesinger et al. | ............. | 198/323 |

FOREIGN PATENT DOCUMENTS

| GB | 1141699 | * | 7/1967 |
|---|---|---|---|
| GB | 1141699 | | 1/1969 |

* cited by examiner

*Primary Examiner* — Leslie A Nicholson, III
*Assistant Examiner* — Keith R Campbell
(74) *Attorney, Agent, or Firm* — Ladas & Parry LLP (57) ABSTRACT

An escalator with a step belt or a moving walkway with a plate belt, which step belt or plate belt comprises at least one transport chain that is arranged to circulate between a first and second deflecting region of the escalator or moving walkway. Steps or plates are arranged at the transport chain and connected with the transport chain. In addition, at least one blocking device is arranged in stationary position and has at least one blocking arm. The blocking arm can be brought into a release position or into an engagement position, wherein this blocking arm in the engagement position engages in at least one link intermediate space of the transport chain and the blocking arm is fixable in the respective release position or engagement position.

20 Claims, 5 Drawing Sheets

ESCALATOR OR MOVING WALKWAY WITH A STEP-BELT OR PLATE-BELT BLOCKING DEVICE

CROSS-REFERENCE TO RELATED APPLICATION

This application claims priority to European Patent Application No. 11164356.5, filed Apr. 29, 2011, which is incorporated herein by reference.

FIELD

The disclosure relates to an escalator or a moving walkway.

BACKGROUND

Escalators or moving walkways have been manufactured and used for a long time. The step belt or plate belt on which the user of the escalator or the moving walkway stands during the transport process is driven by at least one drive motor. The torque thereof is transmitted to a chainwheel by way of a transmission or a drive train. The drive train arranged between the motor shaft and the chainwheel usually comprises a speed step-down transmission in order to step down the high rotational speeds of the drive motor. In addition, the escalator or moving walkway comprises a brake device which acts on the drive train or directly on the drive motor in order to brake the step belt or plate belt.

The step belt or plate belt can be serviced when required or at regular intervals. In that case, extensive work on the step belt or plate belt can also occur. For example, damaged steps or plates have to be exchanged, wear parts such as guide rollers or sliding guides at the transport chain have to be exchanged, the guide track of the guide rollers or sliding guides has to be cleaned or even the entire transport chain or guide track has to be exchanged. These operations are not necessarily without risk for the service specialist, since in the case of removal of parts of the escalator the step belt or plate belt can automatically enter into movement, for example if parts have to be exchanged not only at the step belt, but also at the drive train or drive motor. In order to avoid accidents, maintenance instructions of the manufacturer and the sequence of maintenance operating steps accordingly are often adhered to precisely.

SUMMARY

At least some embodiments comprise an escalator or a moving walkway, at the step belt or plate belt of which maintenance operations can be performed with reduced risk.

An escalator comprises a step belt and a moving walkway comprises a plate belt. The step or plate belt comprises at least one transport chain which is arranged to circulate between a first and a second deflecting region of the escalator or the moving walkway and at which transport chain steps or plates are arranged and connected with the transport chain. In addition, the escalator or moving walkway comprises at least one blocking device, which is arranged in stationary position. This has at least one blocking arm, which blocking arm can be brought into a release position or into an engagement position and in the engagement position engages in at least one element intermediate space of the transport chain. In the release position the blocking arm is completely decoupled from the transport chain, whereby this is movable. Moreover, the blocking arm is fixable in the respective release position or engagement position.

In particular embodiments, it is to be understood by the feature "that the blocking arm engages in at least one element intermediate space of the transport chain" that the blocking arm has a suitable shape, for example at least one projection, tooth, dog, hook, claw or gripper, which projects into intermediate spaces of the transport chain, for example between the chain links. A blocking arm disposed in the engagement position is thus in engagement in at least one link intermediate space of the transport chain. These inter-engaging profiles stand against one another when the transport chain wants to move and the transport chain can move only within the play present between the profiles. For preference the shape engages between the link intermediate spaces present between the outer straps of the transport chain.

In order to drive the transport chain one of these deflecting regions usually includes a rotatably mounted chainwheel, the teeth of which engage in the transport chain. This chainwheel is connected with a drive motor by way of a drive train. The blocking device can increase safety for maintenance personnel. Any known brake device acts on the drive chain arranged between the drive motor and the step belt. As soon as this drive chain is interrupted and due to this interruption the brake is also decoupled, the step belt or plate belt can unintentionally revolve. This can be particularly risky if, for example, plates of the moving walkway or steps of the escalator have been removed for the purpose of exchange. Due to the removal, gaps or fall-through spaces arise in the step belt or plate belt. Due to the demounting and installation of steps or plates a mass difference between the forward run and return run of the step belt or plate belt can arise, which in the case of differences in level of the two deflecting regions generates a forward driving moment and, if the drive train is unbraked or interrupted, sets the unsecured step belt in motion. Also risky can be the installation and demounting of a transport chain. In the case of release and removal of chain straps and chain parts the loose ends of the open chain can be coiled up by an unbraked chainwheel or even slip over the teeth of a blocked chainwheel and lead to serious accidents. By virtue of the direct engagement of the blocking arm and the transport chain at least some risks concerning the transport chain in maintenance operations can be eliminated. The blocking device can be arranged to be stationary in the first or second deflecting region. A blocking device can also be arranged in both deflecting regions. The blocking arm able to be brought into the release position or engagement position is for this purpose possibly mounted to be pivotable between these positions.

The blocking device can comprise a bearing block which includes a first detent point corresponding with the release position and a second detent point corresponding with the engagement position. In addition, the blocking arm comprises a locking segment, wherein the blocking arm is pivotably mounted on the bearing block and the blocking arm is fixable in the release position or in the engagement position by detenting of the locking segment in the detent points. The locking in the two positions helps ensure that the blocking arm does not automatically move and unintentionally release or block the transport chain.

The locking segment is possibly guided at the blocking arm to be linearly displaceable and secured in the first or second detent point by a spring element acting on the locking segment.

In order that the blocking device is operable in user-friendly manner the locking segment can have a grip and a tread tongue. The grip serves for pulling the locking segment out of one of the two detent points. Insofar as the locking segment does not by itself detent in the detent point due to the spring force of the spring element, the stop-and-go locking segment can be pressed into the detent point by foot pressure on the tread tongue.

In order that the blocking device can engage precisely in the transport chain it has to be aligned therewith. A stationary plate bracket is possibly arranged in the first and/or second deflecting region. This plate bracket can have at least one slot or at least one groove with groove blocks. The slot or the groove is arranged in the plane with respect to the length direction of the escalator or the moving walkway and orthogonally with respect to this longitudinal direction. In at least some embodiments, at least one blocking device is fixed to the stationary plate bracket by means of screws, rivets, welding, penetration-joining or gluing.

If the step belt or plate belt comprises two circulating transport chains arranged parallel to one another and the steps or plates are arranged between the transport chains, the blocking device can comprise two blocking arms for increasing safety. A respective blocking arm is thus associated with each transport chain.

An even greater level of safety can be achievable if a respective blocking device with two blocking arms is arranged in each of the first deflecting region and the second deflecting region. A respective blocking arm of the first deflecting region and the respective blocking arm of the second deflecting region can then be associated with each transport chain.

In order to facilitate operation, the two blocking arms of a blocking device can optionally also be mechanically connected together. For this purpose, arranged between the two blocking arms of a blocking device is a connecting member which connects the locking segments of the two blocking arms. The two locking segments can thereby be moved simultaneously.

At least one chainwheel is possibly arranged in the region of the engagement position. This then serves not only for deflecting the transport chain from the forward run to the return run, but also at the same time as opposing mount of the transport chain. An opposing mount separately arranged in the engagement position can thereby be avoided. An opposing mount can be necessary when the transport chain is not tightened sufficiently tautly between the deflecting regions or is even interrupted, so that the transport chain can jump from the blocking arm and/or the chainwheel due to, for example, shocks. In addition, a loose chain between the blocking arm and the chainwheel is caught by the chainwheel as opposing mount. Moreover, through the engagement of the blocking arm in the transport chain and the directly consecutive mechanically positive engagement of the teeth of the chainwheel in the blocked transport chain also the chainwheel can no longer move.

The blocking device arranged in the deflecting regions is prominently visible and it can be readily checked before start of work at the step belt or plate belt whether the blocking arm is in the release position or in the engagement position. Even when the blocking device is visually checkable in simple manner, the drive motor can be switched on due to inattention. An overload safety device (clutch), which is arranged between the drive motor and the transport chain, of the drive train would thereby be unnecessarily loaded.

In order to preclude starting of a drive motor of the escalator or the moving walkway when the blocking device is in the engagement position the blocking device can have a switch element for interrupting the power feed of the drive motor. Moreover, the power feed to a control unit of the escalator or the moving walkway can be interrupted and/or the motor circuit breaker of the drive motor. Intrinsically, the power feed is switched on when the blocking arm is in the release position and the power feed is interrupted when the blocking arm is in the engagement position. In the case of several blocking arms each blocking arm possibly acts on an associated switching element. The switching elements of each blocking arm are connected in such a manner that the power feed to the drive motor remains interrupted even when only one of the blocking arms is in the engagement position.

Obviously, the blocking arms do not necessarily have to be manually pivoted between the release position and the engagement position and/or locked. The blocking device can comprise at least one setting drive by means of which the blocking arm is pivotable and lockable in the engagement position or in the release position. Obviously, it is also possible for only the pivoting of the blocking arm or the locking by displacement of the locking segment to be motorized.

The blocking device according to some embodiments can, moreover, also be used as transport securing means when the escalator or the moving walkway is partly or even completely assembled at the production works. Elongated escalators or moving walkways can also be preassembled in a plurality of sub-segments or modules and supplied to the installation site. These sub-segments can be provided with transport chain sections which are secured by the blocking device. In the case of subsequent transport from the production works for installation in the building or at the building site it is ensured by the blocking device locked in the engagement position that the step belt or plate belt cannot be moved and consequently nobody is injured. Moreover, disruption of the step-belt or plate-belt factory setting is no longer possible during transport, whereby mounting of the escalator or the moving walkway can be substantially simplified.

BRIEF DESCRIPTION OF THE DRAWINGS

The disclosed embodiments are described with reference to the drawings, in which.

DETAILED DESCRIPTION

Figure 1:
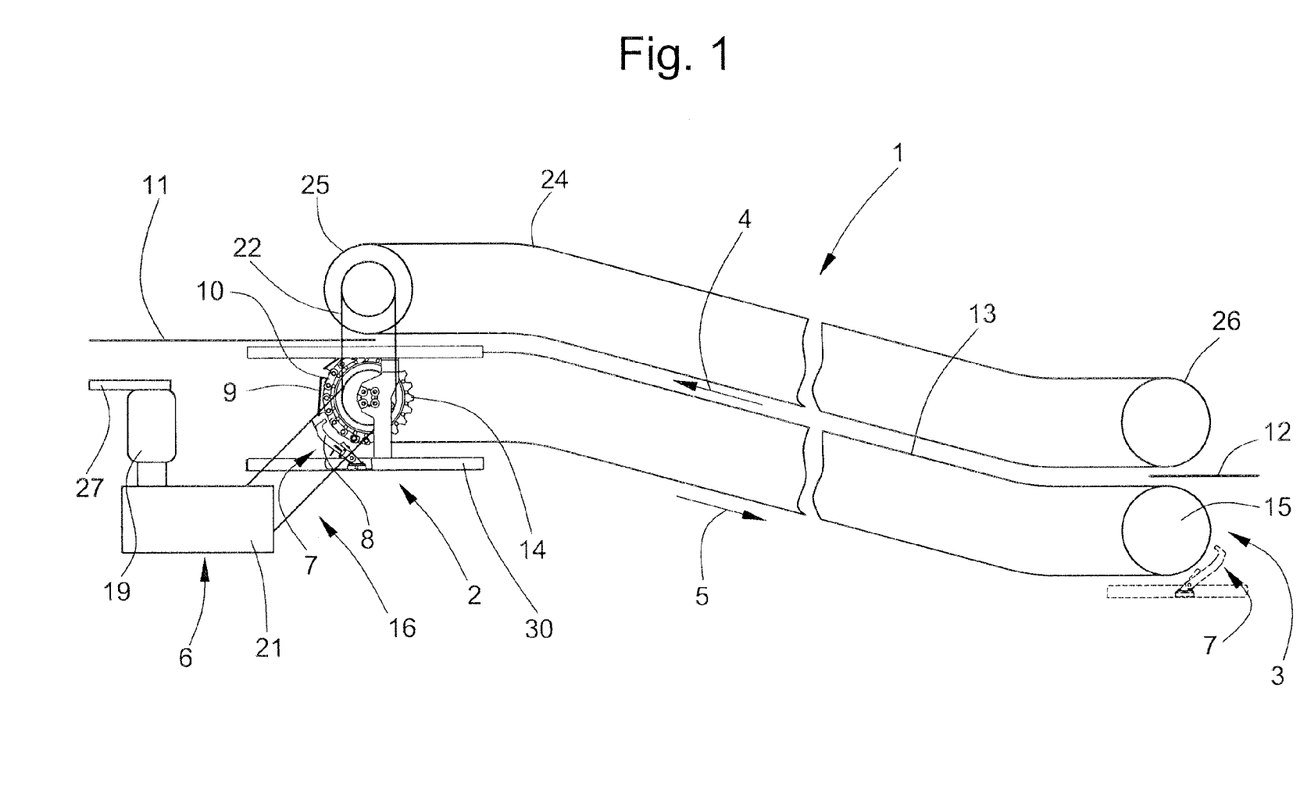
FIG. 1 shows, in schematic illustration, the moved principal components of an escalator or a moving walkway, particularly a drive motor, a drive train, a step belt or plate belt circulating between two chainwheels and a handrail with associated connection to the drive train, wherein a respective chainwheel is arranged in a first deflecting region and a second deflecting region and a blocking device is arranged in the first deflecting region.

FIG. 1 shows in schematic illustration the moved principal components of an escalator or a moving walkway 1. An escalator 1 or a moving walkway 1 has a first deflecting region 2 and a second deflecting region 3, by way of the tread plates 11, 12 of which the users of the escalator 1 or moving walkway 1 enter and leave. Although illustrated only in the first deflecting region 2, the two deflecting regions 2, 3 have a bearer structure 30 which is anchored in stationary position in the building structure of a building (not illustrated). Arranged between the two deflecting regions 2. 3 is a step belt 13 or plate belt 13 which includes at least one transport chain 10 and steps 9 or plates 9 arranged at the transport chain 10. In the following and applicable to all figures, for the sake of easier reading only the escalator 1, step belt 13 and steps 9 are mentioned, but the moving walkway 1, plate belt 13 and plates 9 are intended in analogous manner, since various embodiments are equally suitable for escalators 1 and moving walkways 1. A chainwheel 14,15 is rotatably arranged in each deflecting region 2, 3 for each transport chain 10 which is present. The step belt 13 and consequently the transport chain 10 are designed to circulate and thus have a forward run 4 and a return run 5 as illustrated by arrows. The indication of rotational direction of the step belt 13 by arrows is only by way of example and shows the escalator 1 in upward conveying operating mode. The escalator 1 can also be operated in downwardly conveying operating mode. The deflection of the step belt 13 from the forward run 4 to the return run 5 or from the return run 5 to the forward run 4 takes place in the deflecting regions 2, 3 by the chainwheels 14, 15. Instead of the chainwheel 15 in the second deflecting region 3 a curved guide or a deflecting wheel, which analogously deflects the step belt, can also be present.

Further moved principal components are a drive motor 19, a drive train 6 arranged between the drive motor 19 and the chainwheel 14 of the first deflecting region 2 and a co-travelling handrail 24. The handrail 24 is also designed to circulate and is arranged between two deflecting wheels 25, 26. The deflecting wheel 25 arranged in the first deflecting region 2 is connected with the drive train 6 by means of a handrail drive 22. The drive train 6 comprises a gearwheel transmission 21 flange-mounted on the drive motor 19 and a chain transmission 16, so that the rotational movement of a motor shaft (not illustrated) of the drive motor 19 can be transmitted with speed reduction to the chainwheel 14 of the first deflecting region 2 and the deflecting wheel 25. The drive train 6 can obviously also be connected with the chainwheel 15 of the second deflecting region 3 or each of the deflecting regions 2, 3 can have a respective drive motor 19 and drive train 6. Moreover, the drive motor 19 is equipped with an operating brake 27 which, in the case of braking, brakes the step belt 13, drive train 6 and motor shaft of the drive motor 19. A shoe brake can, by way of example, be used as operating brake, such is disclosed in U.S. Pat. No. 3,830,344 A. A band brake or disc brake is obviously also usable as operating brake 27.

In addition, a blocking device 7 is arranged in the first deflecting region 2. The blocking arm 8 thereof is illustrated in the release position, which means that the blocking arm 8 does not engage in the transport chain 10. As an alternative and as indicated by dashed lines, the blocking device 7 can also be arranged in the second deflecting region 3. Obviously, a respective blocking device 7 can also be arranged in each of the first deflecting region 2 and the second deflecting region 3. In the description of FIGS. 2 to 5 the construction of the blocking device 7 is described in the following in more detail.

Figure 2:
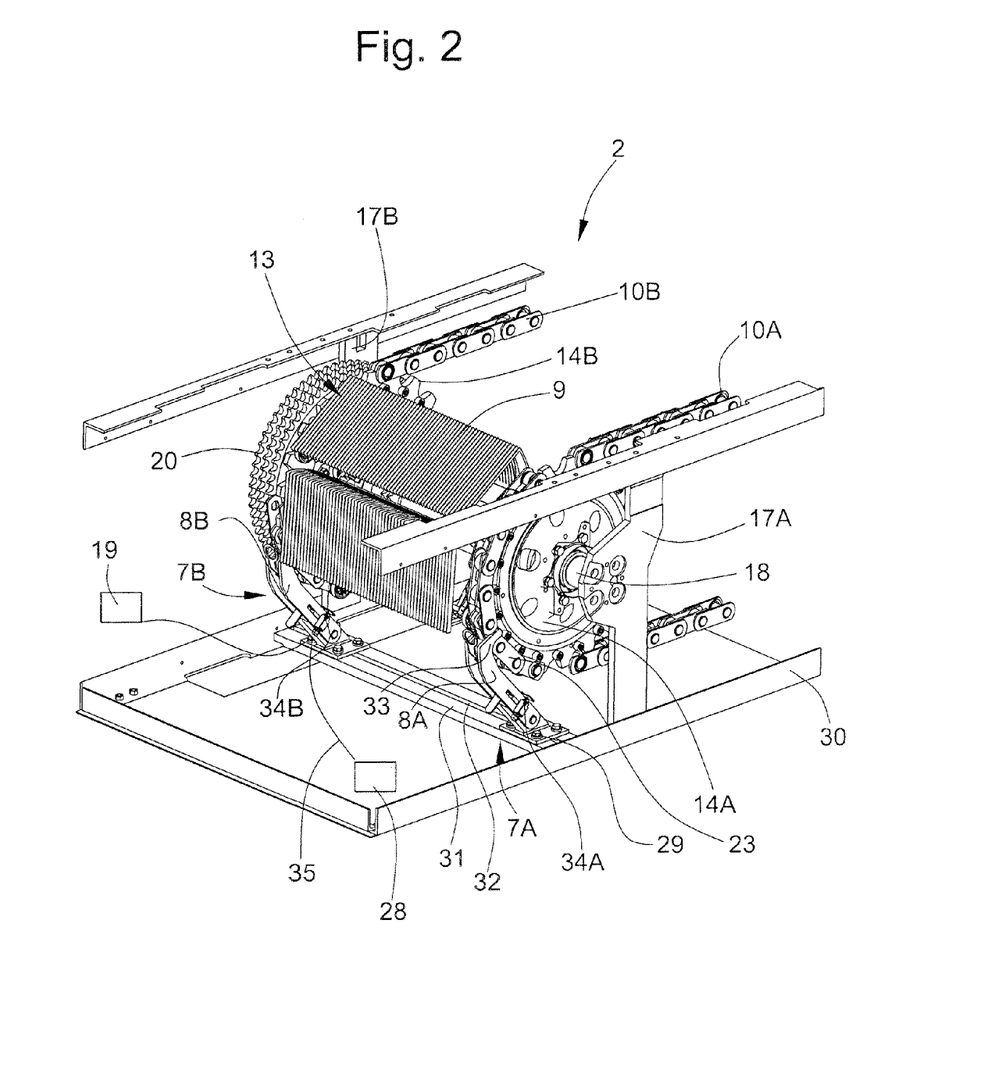
FIG. 2 shows, in three-dimensional view, one of the two deflecting regions of an escalator with two transport chains, wherein the steps are arranged between the transport chains, and a blocking device in a first embodiment, the blocking arms of which are illustrated in the engagement position.

FIG. 2 shows in a three-dimensional view the first deflecting region 2 of the escalator 1, which is illustrated in FIG. 1, with two transport chains 10A, 10B. The first deflecting region 2 includes a load-bearing structure 30, which is part of a framework (not illustrated in more detail) of the escalator 1, and the framework connects the first deflecting region 2 with the second deflecting region 3 to be stiff in bending and torsion as far as possible. The load-bearing structure has two bearing flanges 17A, 17B with bearings, A main shaft 18 is rotatably mounted between the bearing flanges 17A, 17B. A triple-track drive chainwheel 20 as well as two chainwheels 14A, 14B are arranged at the main shaft 18. The drive chainwheel 20 is part of the chain transmission 16 illustrated in FIG. 1. Each of the chainwheels 14A, 14B is embraced at the circumference to the extent of approximately half by an associated transport chain 10A, 10B. The transport chains 10A, 10B are illustrated partly broken away in FIG. 2, so that the teeth of the chainwheels 14A, 14B are also visible. The steps 9 are arranged between the two transport chains 10A, 10B and connect the transport chains 10A, 10B to form a step belt 13. For the sake of easier understanding only two steps 9 are illustrated in FIG. 2, A plate bracket 31 is fixedly connected with the load-bearing structure 30 parallel to the center longitudinal axis of the main shaft 18. The plate bracket 31 has a slot 32 which similarly extends parallel to the center longitudinal axis of the main shaft 18. The slot 23 of the plate bracket 31 can also be formed so that instead of a plate two flat bars are fastened to the load-bearing structure 13 at the spacing of the width of the slot 32. Two blocking devices 7A, 7B are, in a first embodiment, arranged by means of fastening elements, for example screws 29. The blocking devices 7A, 7B can also be fixedly connected with the load-bearing structure 30 by welding, penetration-joining, riveting, gluing and suchlike instead of screws. The two blocking devices 7A, 7B can be combined to form one blocking device with two blocking arms 8A, 8B.

The blocking arms 8A, 8B of the blocking devices 7A, 7B are illustrated in the engagement position. By virtue of the slot 32 each blocking device 7A, 7B can be precisely aligned with respect to the associated transport chain 10A, 10B so that the corresponding blocking arm 8A, 8B can, as illustrated, engage in at least one of the link intermediate spaces of the transport chain 10A, 10B. By link intermediate space there is meant an intermediate space between the link plates 23 and, in particular, not only at the outer sides of the transport chain 10A, 10B, but also in the inner side of the transport chain 10A, 10B, in which also a tooth of the chainwheel 14A, 14B engages. In the illustrated exemplifying embodiment two claws 33 of the blocking arm 8A, 8B, which is of fork-shaped construction, engage in link intermediate spaces at two outer sides of the transport chain 10A, 10B. since the link intermediate space in the inner side of the transport chain 10A, 10B is occupied by a tooth of the chainwheel 14A, 14B. The blocking devices 7A, 7B could also be fixed to the plate bracket 31 by welding, gluing, riveting, penetration-joining and suchlike.

In addition, the power supply of the drive motor 19 with a safety device is schematically illustrated in FIG. 2. Each of the two blocking devices 7A, 7B has a switching element 34A, 34B, the switching path of which is opened or closed depending on the respective setting of the blocking arm 8A, 8B. The connection of the drive motor 19 with the power mains 28 is, as illustrated, interrupted by way of the switching elements 34A, 34B. The switching elements 34A, 34B are connected by a connecting cable 35 with the power mains 28 and with the drive motor 19 in such a manner that a single opened switching element 34A, 34 B is sufficient to interrupt the connection with the power mains 28. It can thus be ensured that the connection of the drive motor 19 with the power mains 28 is interrupted as soon as one of the blocking arms 8A. 8B is in the engagement position.

Figure 3:
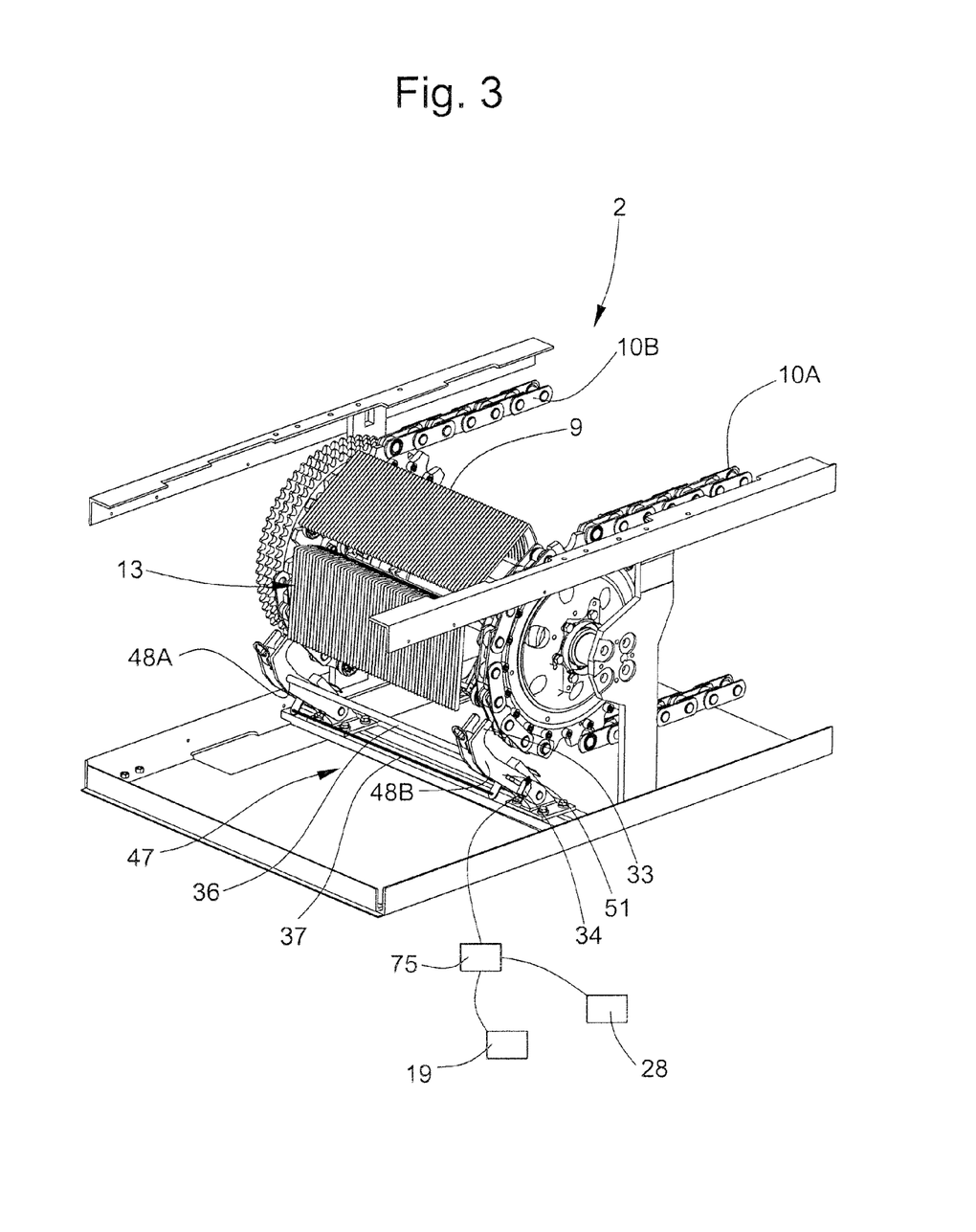
FIG. 3 shows, in three-dimensional view, one of the two deflecting regions of an escalator with two transport chains, wherein the steps are arranged between the transport chains, and a blocking device in a second embodiment, the blocking arms of which are coupled together and illustrated in the release position.

FIG. 3 shows in three-dimensional view substantially the same elements as FIG. 2, for which reason only the changed elements are described in the following. For the sake of better clarity also only two steps 9 are illustrated in FIG. 3. Instead of the step belt 13 a plate belt 13 can also be present. This differs from the step belt merely in that plates 9 instead of steps 9 are arranged between the two transport chains 10A, 10B. The blocking device 47 differs from the first embodiment illustrated in FIG. 2 in that the blocking arms 48A, 48B thereof are connected together and form a unit. In addition, the blocking arms 48A, 48B are illustrated in the release position.

The blocking arms 48A, 48B illustrated in the release position are completely decoupled from the transport chains 10A, 10B so that the step belt 13 can move as intended and can convey the users of the escalator. Also readily visible are the four claws 33 of the blocking arms 48A, 48B disengaged into the release position. Instead of the claws 33 obviously also differently constructed projections and devices such as dogs, hooks, grippers, bars and suchlike can be formed at the blocking arm 48A, 48B, which are suitable for engaging in at least one link intermediate space of the transport chain 10A, 10B.

The blocking arms 48A, 48B can be connected together at least once, but possibly—as illustrated—twice. The first connection is a connecting rod 36 which connects together arm side parts 51, which have the claws 33, of the blocking arms 48A, 48B. The second connection is a connecting member 37 which connects together the locking segments described in more detail in FIG. 4. Since the two blocking arms 48A, 48B can only be pivoted at the same time by virtue of the mechanically rigid connection, only one switching element 34 is also necessary for safeguarding the connection of the drive motor 19 with the power mains 28. In order to help preclude starting of the drive motor 19 when the blocking device 47 or the blocking arms 48A, 48B thereof is or are in the engagement position, the switching element 34 can interrupt the power feed to a control unit 75 of the escalator or the moving walkway and/or act on the motor circuit breaker of the drive motor 19. In accordance with this type, the power feed from the power mains 28 is switched on when the blocking arms 48A, 48B are in the release position and the power feed is interrupted when the blocking arms 48A, 48B are in the engagement position.

Figure 4:
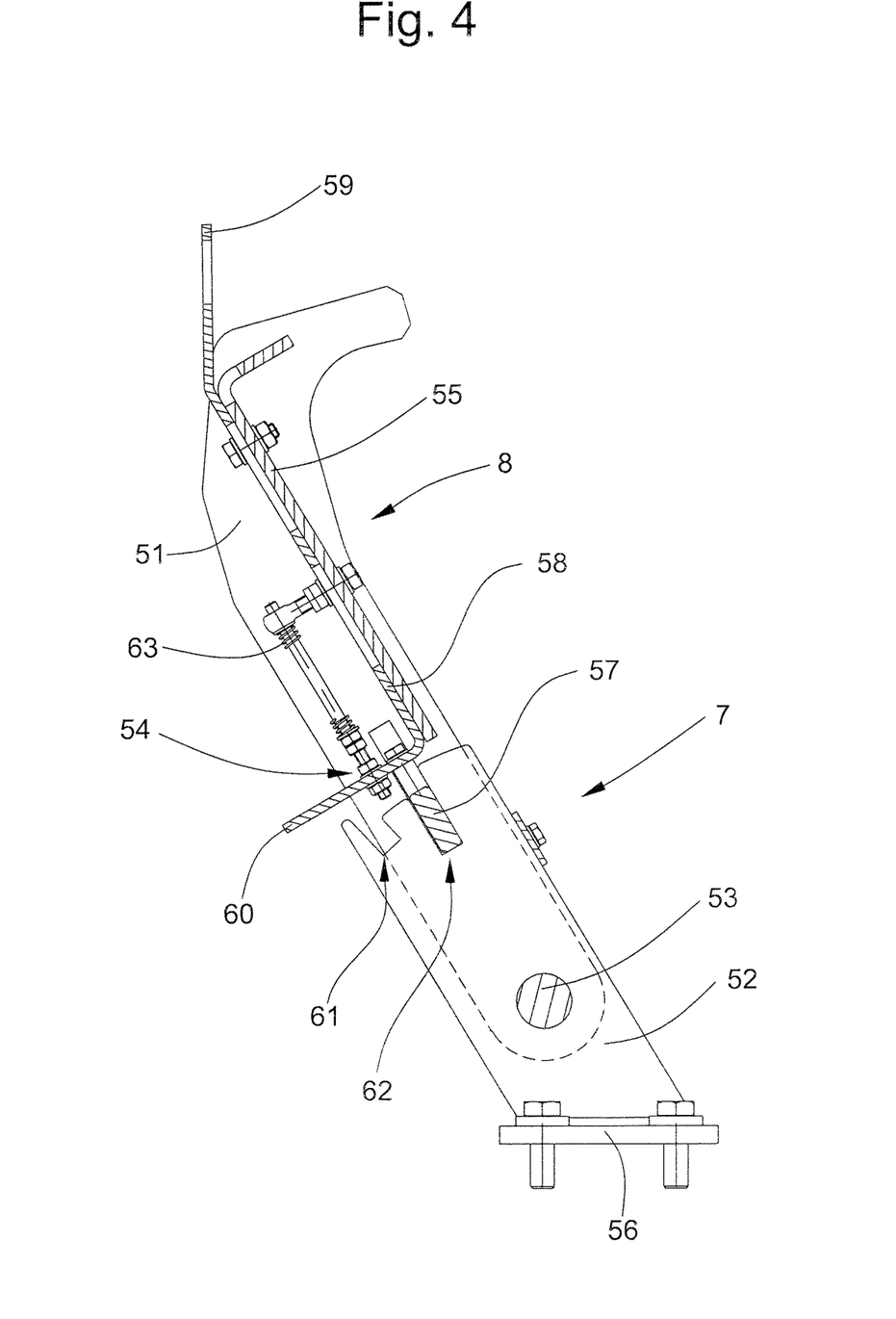
FIG. 4 shows, in a sectional plan, a blocking device with a bearing block and with a blocking arm.

FIG. 4 shows, in sectional elevation, a blocking device 7 with a bearing block 52 and with a blocking arm 8. The following description also applies analogously to the blocking devices 7, 7A, 7B, 47 of all previously described FIGS. 1 to 3. The bearing block 52 in FIG. 4 comprises a base plate 56 by which the bearing block 52 can be fixed to a plate bracket (not illustrated). The bearing block 52 additionally has two detent points 61, 62. The first detent point 61 defines the release position of the blocking arm 8 and the second detent point 62 defines the engagement position of the blocking arm 8, such as defined in the previously described FIGS. 1 to 3.

On the basis of the sectional illustration, of the blocking arm 8 merely one of the two arm side parts 51 is illustrated. The two arm side parts 51 are fixedly connected together by a sectionally illustrated intermediate web 55 and pivotably mounted on the bearing block 52 by means of a bearing pin 53. A locking segment 54 is linearly guided in the arm side parts 51 and at the intermediate web 55. This locking segment 54 comprises a catch 57 and a guide part 58, wherein a grip 59 and a tread tongue 60 are formed at the guide part 58. The tread tongue 60 and the grip 59 serve for simple manual operation of the locking segment 54. Depending on the respective position of the blocking arm 8 the catch 57 rests in the first detent point 61 or in the second detent point 62. In order to bring the blocking arm 8 from the illustrated engagement position into the release position, the grip 59 can be pulled until the catch 57 has left the second detent point 62. Through subsequent pivoting of the blocking arm 8 the catch 57 can be brought from the first detent point 61, which corresponds with the release position, and the grip 59 released. Through a spring element 63 which acts on the guide part 58, the locking segment 54 or the catch 57 thereof is urged into the first detent point 61. If the catch 57 should, with the help of the spring force of the spring element 63, not completely detent in the detent point 61, 62 the spring element 63 can be assisted by foot action on the tread tongue 60.

Figure 5:
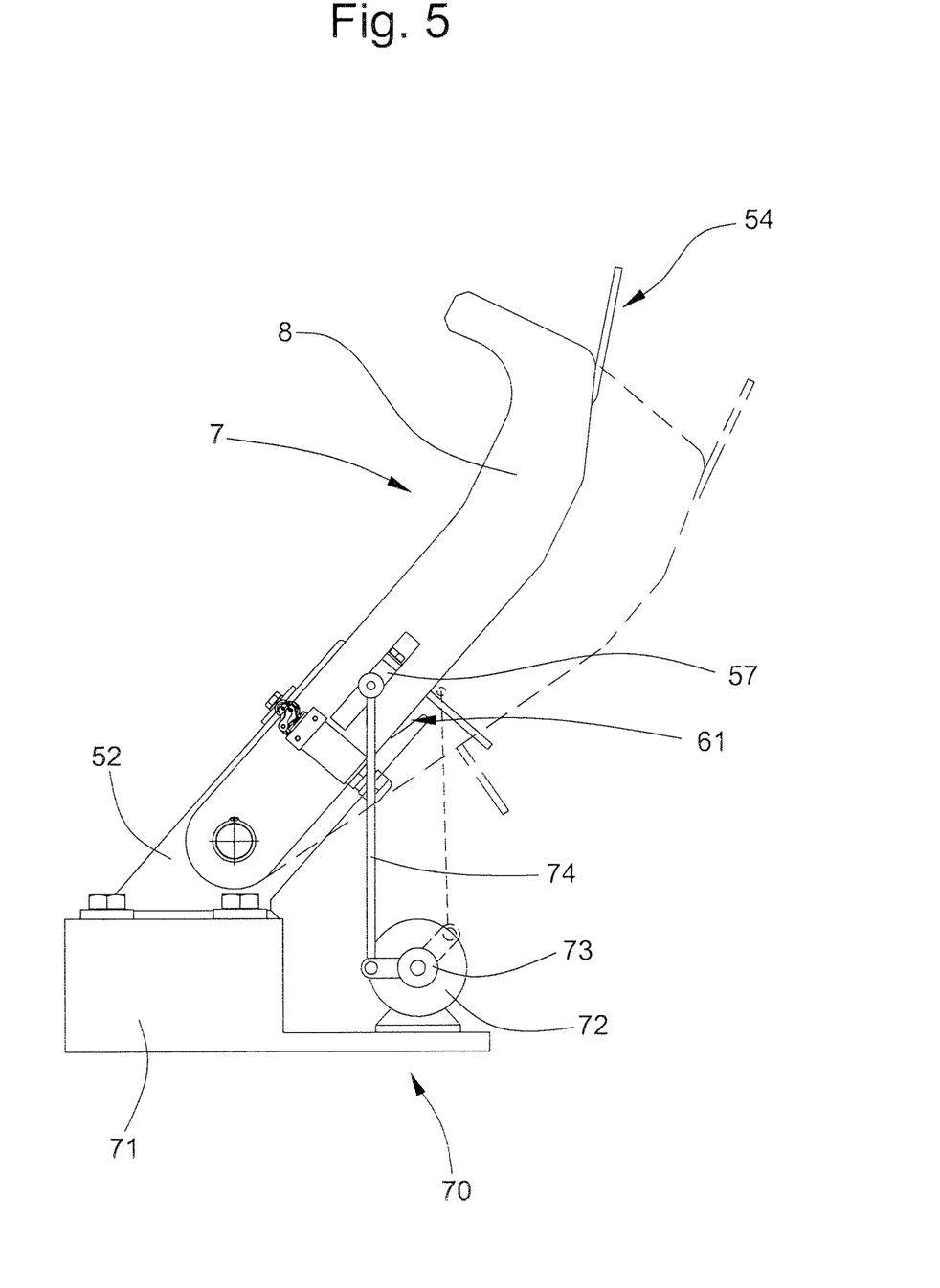
FIG. 5 shows, in plan view, a blocking device, the blocking arm of which can be moved by means of a setting drive between a release position.

A blocking device 7 is illustrated in elevation in FIG. 5, which device corresponds in construction with the blocking device described in FIG. 4, for which reason identical components have the same reference numerals. The sole difference of the blocking device 7 shown in FIG. 5 consists in that the blocking arm 8 thereof can be moved by a schematically illustrated setting drive 70 between a release position and an engagement position.

The setting drive 70 comprises a pedestal 71 fixedly connected with the bearing block 52 and with a servomotor 72. Instead of the bearing block 52, in this exemplifying embodiment the pedestal 71 is fixed to the plate bracket (not illustrated). The servomotor 72 has a crank arm 73, the rotational angle of which is, for example, 130° to 170°. A movement rod 74 is pivotably arranged between the crank arm 73 and the catch 57 of the locking segment 54. On pivoting of the crank arm 73 the catch 57 is pushed by the movement rod 74 initially out of the second detent point (not visible) until the top dead center of the crank drive, which consists of the movement rod 74 and the crank arm 73, is exceeded and the blocking arm 8 is pivoted with respect to the first detent point 61. The catch 57 in that case follows the profile of the bearing block 52 between the two detent points.

As soon as the catch 57 reaches the first detent point 61, it is drawn into the first detent point 61 by the further movement of the movement rod 74. The pivoting of the blocking arm 8 in converse direction takes place analogously by reversal of the pivot direction of the crank arm 73 and the movement rod 74.

Although the disclosed technologies have been described by illustration of specific exemplifying embodiments, numerous further variants of embodiment can be created with knowledge of the present disclosure, for example in that the features of the individual exemplifying embodiments are combined with one another and/or individual functional units of the exemplifying embodiments are exchanged. For example, in all exemplifying embodiments each blocking arm can have an individual setting drive. However, correspondingly in the case of two blocking arms coupled together also only one setting drive can be present in order to move these in common from the release position to the engagement position and back. Automation of the blocking arm can also be carried out by two mutually separate setting drives, wherein the first setting drive generates the linear movement of the catch and the second setting drive the pivot movement of the blocking arm. In further embodiments, the escalator or the moving walkway can have a step belt or a plate belt which comprises, instead of a transport chain at least one transport belt, at least one transport cable or at least one transport band. In at least some embodiments, these can have projections, recesses or passages so that the blocking arm can engage in the transport belt, transport cable or transport band. Instead of chainwheels use can be made in analogous manner of belt or cable pulleys or band drums. Consequently. correspondingly designed transport belts, transport cables or transport bands are to be regarded as equivalents to transport chains, and belt or cable pulleys and band drums are to be regarded as equivalents to chainwheels and are embraced by the scope of protection of the present claims.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. An escalator or a moving walkway, comprising:
a belt, the belt comprising a transport chain, the transport chain being arranged to circulate between first and second deflecting regions of the escalator or the moving walkway;
steps or plates, the steps or plates being connected to the transport chain; and
a blocking device, the blocking device being in a stationary position and comprising a blocking arm and a switch, the blocking arm being settable into a release position and into an engagement position, the blocking arm in the engagement position engaging at least one link intermediate space of the transport chain, the blocking arm being fixable in the release position or in the engagement position, the switch being for a power feed of a drive motor of the escalator or moving walkway and being closed when the blocking arm is in the release position and open when the blocking arm is in the engagement position.

2. The escalator or the moving walkway of claim 1, comprising the escalator, the belt being a step belt, the steps or plates comprising steps.

3. The escalator or the moving walkway of claim 1, comprising the moving walkway, the belt being a plate belt, the steps or plates comprising plates.

4. The escalator or the moving walkway of claim 1, the stationary position of the blocking device being in the first deflecting region.

5. The escalator or the moving walkway of claim 1, the stationary position of the blocking device being in the second deflecting region.

6. The escalator or the moving walkway of claim 1, the blocking arm being pivotable between the release position and the engagement position.

7. The escalator or the moving walkway of claim 1, the blocking device comprising a bearing block, the bearing block having first and second detent points, the first detent point being for the release position and the second detent point being for the engagement position, the blocking arm comprising a locking segment configured to receive the first and second detent points.

8. The escalator or the moving walkway of claim 1, a stationary plate bracket being arranged in the first or second deflecting region, the stationary plate bracket having at least one slot or groove, the slot or groove being arranged beneath a plane of motion of the belt.

9. The escalator or the moving walkway of claim 1, the transport chain being a first circulating transport chain, the belt further comprising a second circulating transport chain, the steps or plates being connected to the first and second circulating transport chains, the blocking arm being a first blocking arm, the blocking device further comprising a second blocking arm, the first blocking arm being associated with the first circulating transport chain, and the second blocking arm being associated with the second circulating transport chain.

10. The escalator or the moving walkway of claim 9, further comprising a connector coupled to the first and second blocking arms.

11. The escalator or the moving walkway of claim 1, the transport chain being a first circulating transport chain, the belt further comprising a second circulating transport chain, the steps or plates being connected to the first and second circulating transport chains, the blocking device being a first blocking device, the escalator or moving walkway further comprising a second blocking device, the first blocking device being arranged in the first deflecting region, and the second blocking device being arranged in the second deflecting region.

12. The escalator or the moving walkway of claim 1, further comprising a chainwheel arranged near the engagement position.

13. The escalator or the moving walkway of claim 1, the blocking arm being a first blocking arm, the blocking device further comprising:
a second blocking arm; and
a second switch, the second switch being coupled to the second blocking arm and to the power feed of the drive motor.

14. The escalator or the moving walkway of claim 1, the blocking device comprising a setting drive, the setting drive allowing the blocking arm to pivot.

15. The escalator or the moving walkway of claim 1, the blocking device being lockable.

16. An escalator or a moving walkway, comprising:
a belt, the belt comprising a transport chain, the transport chain being arranged to circulate between first and second deflecting regions of the escalator or the moving walkway;
steps or plates, the steps or plates being connected to the transport chain; and
a blocking device and a bearing block, the blocking device being in a stationary position and comprising a blocking arm, the blocking arm being settable into a release position and into an engagement position, the blocking arm in the engagement position engaging at least one link intermediate space of the transport chain, the blocking arm being fixable in the release position or in the engagement position, the bearing block having first and second detent points, the first detent point being for the release position and the second detent point being for the engagement position; the blocking arm comprising a locking segment configured to receive the first and second detent points.

17. The escalator or the moving walkway of claim 16, the locking segment being guided at the blocking arm to be linearly displaceable, the locking segment being securable at the first or second detent point by a spring element.

18. The escalator or the moving walkway of claim 16, the locking segment comprising a grip and a tread tongue.

19. The escalator or the moving walkway of claim 16, the transport chain being a first circulating transport chain, the belt further comprising a second circulating transport chain, the steps or plates being connected to the first and second circulating transport chains, the blocking arm being a first blocking arm, the blocking device further comprising a second blocking arm, the first blocking arm being associated with the first circulating transport chain, and the second blocking arm being associated with the second circulating transport chain.

20. The escalator or the moving walkway of claim 16, the blocking device comprising a setting drive, the setting drive allowing the blocking arm to pivot.

* * * * *